A. R. Nixon' Cotton Planter & Chopper
No. 116741 — Fig. 1
PATENTED JUL. 4 1871
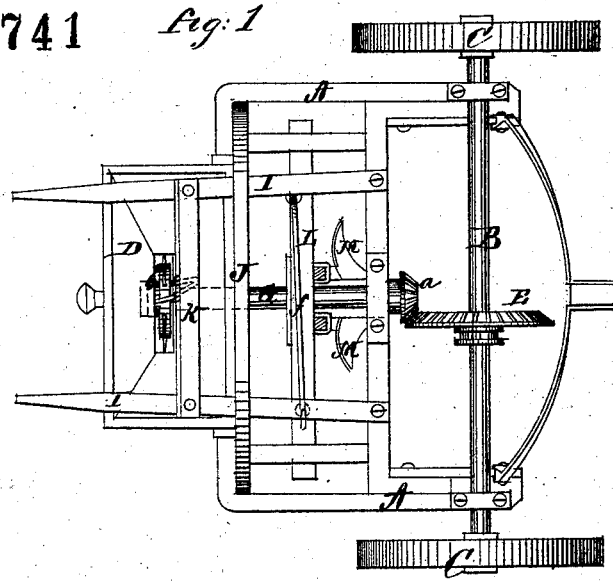
Fig. 2
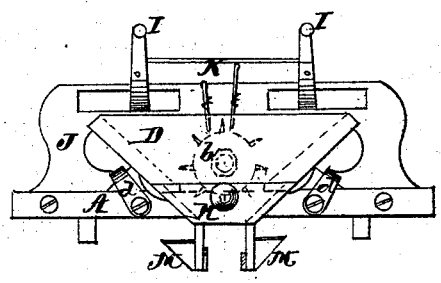
Fig. 3
Fig. 4
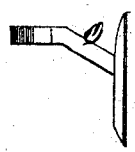
Witnesses.
C. L. Evert
Jas. E. Hutchinson
Inventor.
A. R. Nixon
per
Alexander Mason
Attys.

116,741

UNITED STATES PATENT OFFICE.

ABEL R. NIXON, OF POLO, ILLINOIS.

IMPROVEMENT IN COMBINED COTTON-PLANTERS AND CHOPPERS.

Specification forming part of Letters Patent No. 116,741, dated July 4, 1871.

*To all whom it may concern:*

Be it known that I, ABEL R. NIXON, of Polo, in the county of Ogle and in the State of Illinois, have invented certain new and useful Improvements in Convertible Cotton-Planter; and do hereby declare that the following is a full, clear, and exact description thereof, reference being had to the accompanying drawing and to the letters of reference marked thereon making a part of this specification.

The nature of my invention consists in the construction and arrangement of a cotton-planter and chopper, as will be hereinafter more fully set forth.

In order to enable others skilled in the art to which my invention appertains to make and use the same, I will now proceed to describe its construction and operation, referring to the annexed drawing, in which—

Figure 1 is a plan view, and Fig. 2 a rear elevation of my machine. Figs. 3 and 4 are views of hoes used with the same.

A represents the frame of my machine, at the front end of which, in suitable boxes, is placed the axle B. C C are the wheels placed upon the ends of the axle, and one or both of which should be fast to the axle, so that the axle will revolve with the wheel. Upon the axle B is placed a miter-wheel, E, which gears with a bevel-pinion, $a$, placed on the front end of a shaft, G, running at right angles with the axle. The rear end of this shaft passes into a seed-hopper, D, and is provided with a toothed wheel, $b$, for carrying the seed down through the spout H, which slides into the lower end of the box D. The seed-box is held upon the rear part of the frame A by means of hooks $d\ d$, as shown in Fig. 2. Upon a cross-bar in the frame A are pivoted the front ends of the handles I I, which pass through a slotted frame, J, standing up vertically from the main frame A immediately in front of the seed-box D. The two handles I I are, directly above the seed-box, connected by a bar, K, from which rods $e\ e$ pass down into the box D, and, by the motion of the handles, agitate the seed. From one of the handles I a hook, $f$, connects with a sliding bar, L L, in the main frame A, to which bar the plows M M are attached. These plows, as arranged, are for the purpose of throwing the ground from the cotton and bringing it to a narrow ridge. They are moved by the operator, when necessary, from side to side by the motion of the handles to suit any unevenness in the ground. After the chopping is done they can be changed to place the ground back again by reversing them.

For chopping, the box D and bar K are first removed, then the wheel $b$ taken off from the shaft G, and the hoe N or O put on in place thereof. The hoe N has two prongs, while the other, O, has only one.

Having thus fully described my invention, what I claim as new, and desire to secure by Letters Patent, is—

The main frame A, sliding bar L, plows M M, hooks $f$, and pivoted handles I I, in combination with the axle B, gear E, shaft G, and wheel $a$, adapted to receive and operate the planting mechanism or choppers, substantially as described.

In testimony that I claim the foregoing I have hereunto set my hand this 16th day of March, 1871.

A. R. NIXON.

Witnesses:
   E. F. NANCE,
   ANDREW GRIMES.